(12) United States Patent
Wolff et al.

(10) Patent No.: US 7,141,524 B2
(45) Date of Patent: Nov. 28, 2006

(54) LEAD-FREE AND PREFERABLY ARSENIC-FREE DENSE OPTICAL CROWN GLASS

(75) Inventors: Silke Wolff, Hueckeswagen (DE); Ute Woelfel, Mainz (DE)

(73) Assignee: Schott AG, Mainz (DE)

( * ) Notice: Subject to any disclaimer, the term of this patent is extended or adjusted under 35 U.S.C. 154(b) by 327 days.

(21) Appl. No.: 10/643,539

(22) Filed: Aug. 19, 2003

(65) Prior Publication Data

US 2004/0092378 A1    May 13, 2004

(30) Foreign Application Priority Data

Aug. 23, 2002    (DE)    ................. 102 39 572

(51) Int. Cl.
*C03C 3/16*    (2006.01)
(52) U.S. Cl. ............. 501/45; 501/47; 501/48
(58) Field of Classification Search ........... 501/45–48, 501/903, 45–18
See application file for complete search history.

(56) References Cited

U.S. PATENT DOCUMENTS

| | | | |
|---|---|---|---|
| 3,979,322 A * | 9/1976 | Alexeev et al. | 252/301.6 P |
| 4,871,230 A | 10/1989 | Yamashita | |
| 4,940,677 A * | 7/1990 | Beall et al. | 501/45 |
| 4,996,172 A * | 2/1991 | Beall et al. | 501/45 |
| 5,021,366 A | 6/1991 | Aitken | |
| 5,071,795 A * | 12/1991 | Beall et al. | 501/44 |
| 5,256,604 A * | 10/1993 | Aitken | 501/45 |
| 5,668,066 A * | 9/1997 | Oguma et al. | 501/45 |

FOREIGN PATENT DOCUMENTS

| | | |
|---|---|---|
| EP | 0 494 358 A1 | 7/1992 |
| EP | 0 566 866 A2 | 10/1993 |
| JP | 09278479 A | 10/1997 |

OTHER PUBLICATIONS

Machine translation of Japanese Patent Publication 09-278479. □□.*
Machine translation of Japanese Patent Publication 11-268927A.*
Patent Abstracts of Japan JP9100136A2, Apr. 15, 1997.
Patent Abstracts of Japan 11268927 A, Oct. 5, 1999.
Patents Abstracts of Japan 02124743 A, May 14, 1990.
Patent Abstracts of Japan JP 63021240. Jan. 28, 1988.
Patent Abstracts of Japan JP 61040839, Feb. 27, 1986.

* cited by examiner

*Primary Examiner*—J. A. Lorengo
*Assistant Examiner*—Elizabeth A. Bolden
(74) *Attorney, Agent, or Firm*—Michael J. Striker

(57) ABSTRACT

The lead-free, $Li_2O$-free, CuO-free and preferably arsenic-free optical glass is suitable for applications in the fields of imaging, projection, telecommunications, optical communication technology and/or laser technology, and has a refractive index $n_d$ of $1.55 \leq n_d \leq 1.60$, an Abbe number $V_d$ of $54 \leq V_d \leq 63$ and a transformation temperature $Tg \leq 500°$ C. This optical glass has good production and processing properties and crystallization stability, and, at the same time, advantageously does not contain PbO and $As_2O_3$. These glasses contain, in percent by weight based on oxide content: $P_2O_5$, 43-56; $ZnO$, 21-36; $Al_2O_3$, 0-6; $Na_2O$, 0-16; $K_2O$, 0-8; $\Sigma M_2O \leq 16$; MgO, 0-5; CaO, 0-5; BaO, 3-14; $B_2O_3$, 0-8; $La_2O_3$, 0-7. In addition, it may also contain standard refining agents.

14 Claims, No Drawings

LEAD-FREE AND PREFERABLY ARSENIC-FREE DENSE OPTICAL CROWN GLASS

BACKGROUND OF THE INVENTION

1. Field of the Invention

The present invention relates to a lead-free and preferably arsenic-free optical dense crown glass, to the use of a glass of this type for the fields of imaging, projection, telecommunications, optical communication technology and laser technology, and to optical elements and preforms of these optical elements.

2. Description of the Related Art

In recent years, in both optical and opto-electronic technologies (application areas including imaging, projection, telecommunications, optical communication technology and laser technology), there has been a considerable market trend towards miniaturization. This is apparent from the ever-decreasing size of end products and of course requires increasing miniaturization of the individual modules and components of end projects of this type. For producers of optical glasses, this trend, despite increasing numbers of end products, entails a considerable drop in volume demand for raw glass. At the same time, the further processors are putting increasing pressure on glass manufacturers' prices, since the production of smaller components of this type from block glass and/or draw rod glass in percentage terms, based on the product, entails significantly increased scrap, and the, machining of extremely small parts of this nature entails higher costs than larger components.

As an alternative to separating optical components out of block glass or draw rod glass, as has hitherto been customary, production processes in which performs, which are as near net shape as possible, can be obtained directly from the glass melt have recently been becoming increasingly important. For example, the further processors are demanding precisely pressed small components or precursors thereof, i.e. near net shape preforms, for repressing, known as precision gobs. Precision gobs are generally understood as meaning preferably completely fire polished, semi-free or free formed glass portions, which are accessible via various production processes.

One method for producing precision gobs is the bead spraying process, in which glass beads with a defined size distribution are produced from the glass melt by means of a spraying process. The desired size fraction(s) is/are separated off, for example, by screening. The residual fraction does not have to be discarded, but rather can be recycled as high-purity cullet, which can be melted down again particularly well. This process, which is very simple to carry out in terms of technology and labor requirement and does not require targeted portioning of the glass strand, allows large numbers to be produced within a short time.

However, the process of near net shape direct pressing, which is higher up in the value-added chain, known as blank pressing, is more advantageous. This process allows the smaller volumes of glass melt (distributed over a large number of small pieces of material) to be flexibly counteracted by means of short set-up times. However, compared to gob spraying, the reduced number of cycles and pieces and, with small geometry, the added value cannot be derived from the value of the material alone. Therefore, the products have to leave the press in a state, which is "ready for system installation", i.e. it must be possible to dispense with the expensive re-machining, cooling and/or further processing in the cold state. On account of the highly accurate geometry required, precision equipment with high-quality and therefore expensive mold materials must be used for a pressing process of this type. The service lives of these molds are a huge factor in the profitability of the products and/or materials produced. An extremely important factor with regard to achieving a long service life is that the operating temperature must be as low as possible but this operating temperature can only be reduced to an extent that still ensures that the viscosity of the materials, which are to be pressed, remains sufficient for the pressing operation. Therefore, there is a direct causal link between the processing temperature and therefore the transformation temperature Tg of a glass which is to be processed and the profitability of a pressing operation of this type: the lower the transformation temperature of the glass, the longer the mold service lives become and the greater the profit margin. This relationship therefore results in the need for what are known as "low-Tg glasses", that is to say glasses with low melting and transformation points, i.e. glasses, which have a viscosity, which is sufficient for them to be worked at the lowest possible temperatures.

Recently, an increased demand for "short" glasses has been reported as a further customer criterion with a view to the melt process technology, that is to say a demand for glasses whose viscosity varies considerably with a relatively slight change in the temperature. In the melting process, this behavior has the advantage that the hot-forming times, i.e. the mold closure times, can be reduced. This firstly increases the throughput, i.e. reduces the cycle time, and secondly is gentler on the mold material, which, as has been described above, also has a positive effect on the overall production costs. Short glasses of this type have the further advantage that on account of the more rapid cooling than with corresponding longer glasses it is also possible for glasses with a stronger tendency to crystallize to be worked. This avoids the need for preliminary nucleation, which could cause problems in subsequent secondary hot-forming steps. This opens up the possibility of also enabling glasses of this type to be drawn into fibers.

Although the prior art has already described glasses with a similar optical position or similar chemical composition, these glasses have significant drawbacks.

EP 0 566 866 (Corning) relates to ophthalmic zinc phosphate glasses with an obligatory addition of $Ag_2O$ and $Tl_2O_3$ amounting to in total at least 4% by weight. In this case, these two extremely expensive components are required for ion exchange. In addition, they make the melting process far more difficult, on account of the redox sensitivity of Ag(Ag (1) to Ag(0) and the considerable toxicity of $Tl_2O_3$.

U.S. Pat. No. 5,021,366 (Corning) describes ophthalmic zinc phosphate glasses with an obligatory $Li_2O$ content of at least 1% by weight, which in that case is needed in order to set the specific optical position. However, the addition of $Li_2O$ is disadvantageous, since this component is relatively expensive and increases the tendency to crystallization.

EP 0 494 358 (Corning) relates to low-melting industrial zinc phosphate glasses. However, these glasses also include a chlorine content, which can be detected by analysis and has an adverse effect from the internal optical quality of the glasses.

JP 02-124743 relates to optical glasses which can be used for blank-pressing and which have a similar composition to the glass according to the invention.

However, the glass composition described in this document does not contain any sodium oxide.

The glasses disclosed in JP 11-268927 (Hoya) contain CuO, which imparts a strong color and is therefore strictly forbidden for conventional optical applications/glasses, as an obligatory component in an amount of up to 10% by weight. An obligatory CuO content of this nature (up to 12% by weight) is also described in JP 09 100 136 (Hoya).

The types of glass disclosed in JP 63-021240, wit their obligatory $Nd_2O_3$ content (up to 33% by weight), constitute active laser glasses. An activity of this nature is ruled out for conventional optical applications on account of the undesirable beam modulation, which is to be expected.

The glasses described in U.S. Pat. No. 4,871,230 (Hoya) are not zinc phosphate glasses, but rather alumino-phosphate types, the viscosity-temperature characteristics of which are not comparable to those of zinc phosphate glasses. Their melting point is generally significantly higher and therefore they cannot be referred to as low-Tg glasses. Furthermore, even when $La_2O_3$ is added to glasses of this nature, the required shortness for precision gobs or moldings cannot be achieved.

JP 61-040839 (Ohara) describes an extremely cord-free optical glass, but this property has to be ensured, inter alia, by the obligatory, extremely high refining agent content ($Sb_2O_3 \geq 1\%$ by weight). However, such a high level of added $Sb_2O_3$ is not possible for the above-mentioned modern optical application areas, on account of the expected deterioration in transmission caused by the intrinsic absorption of this component.

SUMMARY OF THE INVENTION

Therefore, the object of the present invention is to provide an optical glass, which has the desired optical properties ($n_d/v_d$) combined, at the same time, with very low transformation temperatures to be achieved even (on account of ecological considerations) without the use of PbO and as far as possible also without $As_2O_3$. These glasses are to be suitable for the application areas imaging, projection, telecommunications, optical communication technology and/or laser technology, and are to have a refractive index $n_d$ of $1.55 \leq n_d \leq 1.60$, an Abbe number $v_d$ of $54 \leq v_d \leq 63$ and the lowest possible transformation temperature $Tg \leq 500°$ C. Furthermore, they are to have good melting and working properties and sufficient crystallization stability, allowing production in continuously operated equipment. Furthermore, it is desirable for the glass to be as short as possible.

The above object is achieved by the embodiments of the present invention, which are described in the claims.

In particular, the invention provides a lead-free and preferably arsenic-free optical glass having a refractive index $n_d$ of $1.55 \leq n_d \leq 1.60$, an Abbe number $v_d$ of $54 \leq v_d \leq 63$ and a transformation temperature $Tg \leq 500$, which comprises the following composition (in % by weight, based on oxide):

| | |
|---|---|
| $P_2O_5$ | 43–56 |
| ZnO | 21–36 |
| $Al_2O_3$ | 0–6 |
| $Na_2O$ | 0.5–16 |
| $K_2O$ | 0–8 |
| $\Sigma M_2O$ | 0–16 |
| MgO | 0–5 |
| CaO | 0–5 |
| BaO | 3–14 |
| $B_2O_3$ | 0–8 |
| $La_2O_3$ | 0–7 |

The glasses according to the invention have the optical position, such as the Abbe number and the refractive index, in common with known optical glasses belonging to similar glass families. However, they are distinguished by good melting and working properties, low production costs on account of reduced working costs, and good environmental compatibility.

In particular, these glasses are suitable for near net shape working, for example by means of a blank-pressing or precise pressing operation. In this context, the viscosity temperature profile and working point of the glasses according to the invention were preferably set in such a way that near net shape hot-forming of this type is also possible using sensitive precision machinery.

Moreover, the combination of crystallization stability and viscosity temperature profile of the glasses according to the invention allows the gasses or preforms made from these glasses to be (further) treated by thermal means (pressing or repressing) virtually without problems.

In particular, the glasses according to the invention have a refractive index $n_d$ of $1.55 \leq n_d \leq 1.60$, preferably $1.56 \leq n_d \leq 1.59$, an Abbe number $v_d$ of $54 \leq v_d \leq 63$, preferably $55 \leq v_d \leq 62$, and a transformation temperature $Tg < 500°$ C., preferably $Tg \leq 450°$ C., most preferably $Tg \leq 400°$ C.

The "inner quality" of a glass is understood, according to the invention, as meaning that the glass includes the minimum possible amount of bubbles and/or cords and/or similar defects or indeed is preferably free of such defects.

In the text which follows, the term "X-free" or "free of a component X" means that the glass substantially does not contain this component X, i.e. that a component of this type is at most present in the glass as an impurity, but is not added to the glass composition as an individual component. In this context, X denotes any desired component, such as for example $Li_2O$.

The basic glass system of the glass according to the invention is the zinc phosphate system, which intrinsically forms a good basis for the desired properties.

In the text, which follows, all the details of the glass component contents are given in % by weight based on oxide content, unless stated otherwise.

The glass according to the invention has a high phosphate content of at least 43% by weight, preferably at least 44% by weight, particularly preferably at least 46% by weight, most preferably at least 48% by weight, and is therefore a low-Tg glass with good melting properties. Reducing the phosphate content to below 43% by weight would lead to glasses, which are no longer able to claim to be "low-Tg-glass". The phosphate content is at most 56% by weight, preferably at most 55% by weight, particularly preferably at most about 53% by weight, most preferably at most 51% by weight. Increasing the phosphate content beyond 56% by weight would reduce the refractive index excessively. Furthermore, the phosphate, as explained in more detail below, is preferably added as a complex phosphate. However, if the phosphate content is over 56% by weight, the proportion of complex phosphates drops in favor of free $P_2O_5$, which can make the melting properties difficult to control and lead to considerably increased evaporation and dusting effects, associated with a reduction in the internal quality. In addition, an increased level of free, non-complex phosphate imposes increased demands on the safety of the production operation, which also increases production costs.

Furthermore, the glass according to the invention has a relatively high added quantity of zinc oxide of at least 21% by weight, preferably 22% by weight, particularly preferably 24% by weight, most preferably at least 25% by weight. Unlike aluminum or barium phosphates, the zinc phosphate glass according to the invention has the desired viscosity-temperature profile, i.e. the glass is sufficiently "short". The high level of added zinc moreover offers the advantage of the large quantities of phosphate, which are required in order to set a low Tg being introduced in complex form as zinc phosphate. This considerably improves the working properties of the glass composition. The tendency of the batch to evaporate and form dust drops drastically and significantly improved glass melt homogeneity are achieved, and this is reflected in particular in the quality and homogeneity of the optical data of the glass which is formed, but also more generally in the improved internal quality with regard, for example, to bubbles and/or cords in the material with a high phosphate content, which is otherwise highly susceptible to cords on account of its shortness. If the zinc oxide content were to be reduced to below 21% by weight, the regulating properties with regard to the shortness of the glasses would no longer sufficiently be brought to bear, and moreover the phosphate content to be introduced as a complex substrate by means of zinc phosphate would drop, which would lead to the above-described adverse effects on the internal quality of the glass which is formed. The glass according to the invention contains at most 36% by weight, preferably at most 32% by weight, particularly preferably at most 31% by weight, most preferably at most 29% by weight of zinc oxide.

To flexibly control the viscosity-temperature characteristic and to further bond phosphate equivalents, at least 3% by weight, preferably at least 4% by weight, most preferably at least 5% by weight of BaO is added to the glass according to the invention. The BaO content in the glass according to the invention is at most 14% by weight, preferably at most 13% by weight, particularly preferably at most 11% by weight and most preferably at most 10% by weight.

In the glass according to the invention, BaO can if desired be partially replaced by the alkaline-earth metal oxides MgO and/or CaO, in which case each one of these components is present in an amount of at most 5% by weight, preferably at most 4% by weight, most preferably at most 3.5% by weight. In total, however, these components preferably form an amount of at most 8% by weight, more preferably at most 5% by weight, most preferably at most 3.4% by weight.

The sum of BaO, MgO and/or CaO is preferably at most 15% by weight, more preferably at most 13% by weight and most preferably at most 11% by weight.

According to certain embodiments of the present invention, the glass according to the invention, for precision-adjustment and for bonding phosphate equivalents, may if appropriate contain $Al_2O_3$ in an amount of at least 0.5% by weight, preferably at least 1% by weight. However, the $Al_2O_3$ content is restricted to at most 6% by weight, preferably at most 5% by weight, particularly preferably at most 3% by weight and most preferably at most 2.5% by weight. The upper limit of 6% by weight indicated should not be exceeded, since otherwise the shortness of the glass is lost on account of the network-forming properties of the $Al_2O_3$.

According to a preferred embodiment of the present invention, the glass according to the invention contains $La_2O_3$ in an amount of at least 0.5% by weight, more preferably at least 0.7% by weight and most preferably at least 1.0% by weight. However, the use of this component in the glass according to the invention should remain limited to an amount of at most 7% by weight, preferably at most 5% by weight, particularly preferably at most 4% by weight and most preferably at most 3.5% by weight. An amount of over 5% by weight likewise has an adverse effect on the shortness of the glass. Moreover, a higher $La_2O_3$ content would undesirably shift the optical position towards higher refractive indices and would increase the tendency towards devitrification, i.e. the tendency towards crystallization, since $La_2O_3$ does not have an unlimited solubility in the zinc phosphate matrix.

Furthermore, the glass according to the invention also contains $Na_2O$ in an amount of at least 0.5% by weight, preferably at least 5% by weight, more preferably at least 6% by weight, most preferably at least 7% by weight. Glasses, which are free of alkali metal oxides, in particular free of $Na_2O$, can lead to deterioration in the melting properties and an increase in the refractive index. Furthermore, the zinc phosphate microstructure may be disrupted, which can have an adverse effect on the chemical resistance of the glass. The addition of alkali metal oxides, in particular $Na_2O$, is therefore preferred in accordance with the invention. The addition of alkali metal oxides serves to optimize the melting properties, i.e. these oxides act as fluxes. $Na_2O$ should be added in an amount of at most 16% by weight, preferably at most 15% by weight, particularly preferably at most 13% by weight, most preferably at most 12% by weight.

$Na_2O$ can, if appropriate, be replaced by at most 8% by weight, preferably at most 6% by weight, particularly preferably at most 4% by weight of other alkali metal oxides $M_2O$, in which case the sum of $M_2O$ should not exceed 16% by weight, preferably 15% by weight, particularly preferably 13% by weight, most preferably 12% by weight. The chemical resistance of the glass may deteriorate if over 16% by weight is added. A further preferred alkali metal oxide in this context is potassium oxide. $Li_2O$ is not preferred, since it is expensive and increases the tendency towards crystallization. The glass according to the invention is therefore preferably free of $Li_2O$.

Moreover, the glasses according to the invention if appropriate contain $B_2O_3$ in an amount of at most 8% by weight, preferably at most 5% by weight. The strongly network-forming properties of $B_2O_3$ increase the stability of the glasses with respect to crystallization and/or the chemical resistance. However, the amount of this component should be no more than 8% by weight, since otherwise the glass network is excessively strengthened and the Tg and melting point of the glass increase undesirably. Also, the glasses then become "longer", which is also not preferred in accordance with the present invention. Therefore, particularly preferred embodiments of the glass according to the invention are free of $B_2O_3$.

As an optical glass, the glass according to the invention is preferably also free of coloring and/or optically active components.

In particular, the glass according to the invention is also free of components, which are redox-sensitive, for example Ag, and/or free of toxic components and/or components, which are harmful to health, such as for example Tl and As.

According to one embodiment of the present invention, the glass according to the invention is preferably also free of other components, which are not mentioned in the claims, i.e. according to an embodiment of this nature the glass substantially consists of the components mentioned. The term "substantially consist of" in this context means that other components are present at most as impurities, but are not deliberately added as individual components to the glass composition.

The glass according to the invention may contain standard refining agents in small quantities. It is preferable for the sum of the refining agents added to be at most 2.0% by weight, more preferably at most 1.0% by weight, these quantities being in addition to the 100% by weight of the components of the rest of the glass composition. In the glass according to the invention, at least one of the following components may be present as refining agents (in % by weight, in addition to the rest of the glass composition):

| | |
|---|---|
| $Sb_2O_3$ | 0–1 and/or |
| SnO | 0–1 and/or |
| NaCl | 0–1 and/or |
| $SO_4^{2-}$ | 0–1 and/or |
| F- | 0–1 |

If desired on account of the particular application, the glasses according to the invention can be toughened and/or provided with a refractive index profile by means of a conventional Na/Ag and/or K/Ag ion exchange.

The present invention also relates to the use of the glasses according to the invention for the application areas imaging, projection, telecommunications, optical communication technology and/or laser technology.

The present invention also relates to optical elements, which comprise the glass according to the invention. Optical elements may in this context in particular be lenses, prisms and compact components. In this context, according to the invention, the term "optical element" also encompasses preforms of an optical element of this nature, such as for example gobs, precision gobs and the like. The present invention is explained in more detail below by means of a number of examples. However, the present invention is not restricted to the examples cited.

EXAMPLES

Tables II and III include 13 exemplary embodiments in the preferred composition range and one comparative example. The glasses according to the invention are produced in the following way:

The raw materials for the oxides, preferably the corresponding carbonates, nitrates and/or fluorides, with the phosphate content preferably in the form of complex phosphates, are weighed out, one or more refining agents, such as for example $Sb_2O_3$ are added, and then thorough mixing takes place. The glass batch is melted at approx. 1070° C. in a continuous melting unit and is then refined (1100° C.) and homogenized. The glass can be cast at a casting temperature of approximate 800° C. and worked into the desired approximate dimensions. In the large-volume, continuous apparatus, experience has shown that the temperatures can be reduced by approximately 100° C. and the material can be worked using the near net shape direct-pressing process at approximately 650° C.

TABLE I

MELTING EXAMPLE FOR 100 KG OF GLASS (CALCULATED)

| Oxide | % by weight | Raw material | Weighed-in quantity (kg) |
|---|---|---|---|
| $P_2O_5$ | 45.0 | $P_2O_5$ | 1.89 |
| ZnO | 22.0 | $Zn_3(PO_4)_2$ | 41.50 |
| $Al_2O_3$ | 5.0 | $Al(PO_3)_2$ | 25.64 |
| $Na_2O$ | 15.0 | $Na_2CO_3$ | 25.62 |
| CaO | 1.0 | $CaCO_3$ | 1.77 |
| BaO | 10.0 | $Ba(H_2PO_4)_2$ | 22.32 |
| $La_2O_3$ | 2.0 | $La_2O_3$ | 2.02 |
| $Sb_2O_3$ | 0.3 | $Sb_2O_3$ | 0.31 |
| Total | 100.3 | | 121.07 |

The properties of the glass obtained in this way, whose composition is shown in the above Table I, are given as example 4 in Table II.

Table II includes examples 1 to 7 according to the invention and Table III includes examples 8 to 13 according to the invention as well as comparative example 1.

All the glasses according to the invention have a Tg of less than 500° C., are resistant to crystallization and can be worked without problems.

The glass of the comparative example contains a boron oxide content of 11.5% by weight, which does not comply with the invention and manifests itself, inter alia, in a high Tg of over 500° C.

TABLE II

GLASS COMPOSITIONS (in % by weight, based on oxide) AND ESSENTIAL PROPERTIES THEREOF

| | Example | | | | | | |
|---|---|---|---|---|---|---|---|
| | 1 | 2 | 3 | 4 | 5 | 6 | 7 |
| $P_2O_5$ | 54.8 | 44.0 | 54.8 | 45.0 | 50.3 | 51.0 | 51.4 |
| ZnO | 28.8 | 32.0 | 34.7 | 22.0 | 28.0 | 31.0 | 28.0 |
| $Al_2O_3$ | 1.9 | | 1.1 | 5.0 | 1.8 | 3.0 | 1.9 |
| $B_2O_3$ | | | | | | | |
| $Na_2O$ | 2.6 | 10.0 | 0.9 | 15.0 | 7.0 | 7.0 | 7.0 |
| CaO | 1.9 | 3.0 | 2.4 | 1.0 | 2.0 | | 2.1 |
| BaO | 7.7 | 10.0 | 5.0 | 10.0 | 7.8 | 4.0 | 7.5 |
| $La_2O_3$ | 2.3 | 1.0 | 1.1 | 2.0 | 3.0 | 4.0 | 2.1 |
| $Sb_2O_3$ | 0.3 | 0.3 | | 0.3 | | | 0.3 |
| Total | 100.3 | 100.3 | 100.0 | 100.3 | 100.0 | 100.0 | 100.3 |
| $n_d$ | 1.57076 | 1.58307 | 1.57264 | 1.56280 | 1.57795 | 1.57316 | 1.57562 |
| $v_d$ | 61.43 | 58.77 | 60.64 | 60.02 | 60.56 | 60.35 | 60.79 |
| $P_{g;F}$ | 0.5433 | 0.5476 | 0.5438 | 0.5464 | 0.5447 | 0.5446 | 0.5449 |
| $\Delta P_{g;F}$* | +28 | +26 | +20 | +36 | +28 | +23 | +34 |
| $\alpha_{20/300}$*' | 9.5 | 13.0 | 9.4 | 14.1 | 11.4 | 10.7 | 11.6 |
| $T_g$ [° C.] | 391 | 359 | 459 | 375 | 377 | 384 | 394 |
| $\rho$, [g/cm$^3$] | 3.23 | 3.40 | 3.34 | 3.23 | 3.30 | 3.27 | 3.30 |

*multiply values for $\Delta P_{g;F}$ by $10^{-4}$;
*'units of $\alpha$ $10^{-6}$/K

TABLE III

GLASS COMPOSITIONS (in % by weight, based on oxide) AND ESSENTIAL PROPERTIES THEREOF

| | Example | | | | | | Comparative #1 |
|---|---|---|---|---|---|---|---|
| | 8 | 9 | 10 | 11 | 12 | 13 | |
| $P_2O_5$ | 48.4 | 54.0 | 48.4 | 48.0 | 50.9 | 52.0 | 45.5 |
| ZnO | 22.1 | 32.0 | 27.0 | 29.0 | 27.8 | 26.0 | 27.3 |
| $Al_2O_3$ | 2.6 | | 1.8 | | 1.9 | 1.0 | 2.3 |
| $B_2O_3$ | | | | | | | 11.5 |
| $Na_2O$ | 8.2 | 9.0 | 7.0 | 12.0 | 7.3 | 8.0 | |
| CaO | 1.5 | | 2.0 | 4.0 | 2.0 | 3.0 | 1.9 |
| BaO | 12.0 | 4.0 | 10.0 | 4.0 | 7.5 | 8.0 | 9.0 |
| $La_2O_3$ | 5.2 | 1.0 | 4.0 | 3.0 | 2.6 | 2.0 | 2.5 |
| $Sb_2O_3$ | 0.3 | | 0.3 | | 0.3 | 0.3 | |
| Total | 100.3 | 100.0 | 100.3 | 100.0 | 100.3 | 100.3 | 100.3 |
| $n_d$ | 1.58215 | 1.56058 | 1.58283 | 1.57085 | 1.57547 | 1.57045 | 1.58992 |
| $v_d$ | 55.70 | 60.39 | 60.50 | 59.69 | 60.76 | 61.11 | 62.25 |
| $P_{g;F}$ | 0.3590 | 0.5547 | 0.5454 | 0.5467 | 0.5451 | 0.5440 | 0.5390 |
| $\Delta P_{g;F}$* | −19 | +24 | +34 | +33 | +35 | +30 | 0 |
| $\alpha_{20/300}$*' | 12.6 | 12.9 | 11.8 | 13.6 | 11.5 | 12.2 | 7.15 |
| $T_g$ [°C.] | 377 | 337 | 397 | 347 | 381 | 353 | 515 |
| $\rho$, [g/cm$^3$] | 3.32 | 3.18 | 3.36 | 3.24 | 3.28 | 3.23 | 3.27 |

*multiply values for $\Delta P_{g;F}$ by $10^{-4}$;
*'units of $\alpha$ $10^{-6}$/K The disclosure in German Patent Application 102 39 572.1-45 of Aug. 23, 2002 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in lead-free optical glasses, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A lead-free optical glass having a refractive index $n_d$ of $1.55 \leq n_d \leq 1.60$, an Abbe number $V_d$ of $54 \leq V_d \leq 63$ and a transformation temperature $Tg \leq 500°$ C., wherein said glass is free of $Li_2O$, free of CuO and comprises a composition, in percent by weight, based on oxide content, of:

| | |
|---|---|
| $P_2O_5$ | 43–56 |
| ZnO | 21–36 |
| $Al_2O_3$ | 0–6 |
| $Na_2O$ | 0.5–16 |
| $K_2O$ | 0–8 |
| $\Sigma M_2O$ | ≤16 |
| MgO | 0–5 |
| CaO | 0–5 |
| BaO | 3–14 |
| $B_2O_3$ | 0–8 |
| $La_2O_3$ | 0–7, | wherein $\Sigma M_2O$ is a sum total amount of all alkali metal oxides present.

2. The lead-free optical glass as defined in claim 1, containing from 0.5 to 7 percent by weight of said $La_2O_3$.

3. The lead-free optical glass as defined in claim 1, and free of arsenic.

4. The lead-free optical glass as defined in claim 1, containing, in percent by weight, as refining agent, at least one of: from 0 to 1 percent by weight, $Sb_2O_3$; from 0 to 1 percent by weight, SnO; from 0 to 1 percent by weight, NaCl; from 0 to 1 percent by weight, $SO_4^{2-}$; and from 0 to 1 percent by weight, $F^-$.

5. A lead-free optical glass having a refractive index $n_d$ of $1.56 \leq n_d \leq 1.59$, an Abbe number $V_d$ of $55 \leq V_d \leq 62$ and a transformation temperature $Tg \leq 500°$ C., wherein said glass is free of $Li_2O$, free of CuO and comprises a composition, in percent by weight, based on oxide content, of:

| | |
|---|---|
| $P_2O_5$ | 44–55 |
| ZnO | 22–32 |
| $Al_2O_3$ | 0–5 |
| $Na_2O$ | 5–15 |
| $K_2O$ | 0–8 |
| $\Sigma M_2O$ | ≤15 |
| MgO | 0–5 |
| CaO | 0–5 |
| $\Sigma MgO + CaO$ | ≤8 |
| BaO | 4–13 |
| $B_2O_3$ | 0–8 |
| $La_2O_3$ | 0.5–5, | wherein $\Sigma M_2O$ is a sum total amount of all alkali metal oxides present.

6. The lead-free optical glass as defined in claim 5, and free of arsenic.

7. The lead-free optical glass as defined in claim 5, containing, in percent by weight, as refining agent, at least one of: from 0 to 1 percent by weight, $Sb_2O_3$; from 0 to 1 percent by weight, SnO; from 0 to 1 percent by weight, NaCl; from 0 to 1 percent by weight, $SO_4^{2-}$; and from 0 to 1 percent by weight, $F^-$.

8. A lead-free optical glass having a refractive index $n_d$ of $1.56 \leq n_d \leq 1.59$, an Abbe number $V_d$ of $55 \leq V_d \leq 62$ and a transformation temperature $Tg \leq 450°$ C., wherein said glass is free of $Li_2O$, free of CuO and comprises a composition, in percent by weight, based on oxide content, of:

| | |
|---|---|
| $P_2O_5$ | 46–53 |
| ZnO | 24–31 |
| $Al_2O_3$ | 0–3 |
| $Na_2O$ | 6–13 |
| $K_2O$ | 0–6 |
| $\Sigma M_2O$ | $\leq 13$ |
| MgO | 0–4 |
| CaO | 0–4 |
| $\Sigma$MgO + CaO | $\leq 5$ |
| BaO | 4–11 |
| $B_2O_3$ | 0–5 |
| $La_2O_3$ | 0.5–4, | wherein $\Sigma M_2O$ is a sum total amount of all alkali metal oxides present.

9. The lead-free optical glass as defined in claim 8, and free of arsenic.

10. The lead-free optical glass as defined in claim 8, containing, in percent by weight, as refining agent, at least one of: from 0 to 1 percent by weight, $Sb_2O_3$; from 0 to 1 percent by weight, SnO; from 0 to 1 percent by weight, NaCl; from 0 to 1 percent by weight, $SO_4^{2-}$; and from 0 to 1 percent by weight, $F^-$.

11. A lead-free optical glass having a refractive index $n_d$ of $1.56 \leq n_d \leq 1.59$, an Abbe number $V_d$ of $55 \leq V_d \leq 62$ and a transformation temperature $Tg \leq 400°$ C., said glass comprising a composition, in percent by weight, based on oxide content, of:

| | |
|---|---|
| $P_2O_5$ | 48–51 |
| ZnO | 25–29 |
| $Al_2O_3$ | 0.5–2.5 |
| $Na_2O$ | 7–12 |
| $K_2O$ | 0–4 |
| $\Sigma M_2O$ | $\leq 12$ |
| MgO | 0–3 |
| CaO | 0.5–3.5 |
| $\Sigma$MgO + CaO | $\leq 3.5$ |
| BaO | 5–10 |
| $La_2O_3$ | 0.5–3.5, | wherein $\Sigma M_2O$ is a sum total amount of all alkali metal oxides present.

12. The lead-free optical glass as defined in claim 11, and free of arsenic.

13. The lead-free optical glass as defined in claim 11, containing, in percent by weight, as refining agent, at least one of: from 0 to 1 percent by weight, $Sb_2O_3$; from 0 to 1 percent by weight, SnO; from 0 to 1 percent by weight, NaCl; from 0 to 1 percent by weight, $SO_4^{2-}$; and from 0 to 1 percent by weight. $F^-$.

14. An optical element comprising a lead-free glass as defined in claim 1.

* * * * *